(12) United States Patent
Christman et al.

(10) Patent No.: US 8,565,949 B2
(45) Date of Patent: Oct. 22, 2013

(54) METHOD OF CONTROLLING A HYBRID POWERTRAIN TO ENSURE BATTERY POWER AND TORQUE RESERVE FOR AN ENGINE START AND HYBRID POWERTRAIN WITH CONTROL SYSTEM

(75) Inventors: Anthony Christman, Madison Heights, MI (US); Shaochun Ye, Wixom, MI (US); Michael Arnett, Wixom, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 627 days.

(21) Appl. No.: 12/881,271

(22) Filed: Sep. 14, 2010

(65) Prior Publication Data

US 2012/0065819 A1 Mar. 15, 2012

(51) Int. Cl.
*B60L 15/20* (2006.01)
*B60W 20/00* (2006.01)

(52) U.S. Cl.
USPC .......... 701/22; 701/33.5; 701/31.4; 701/29.2; 701/64; 180/65.23; 180/65.245; 477/109

(58) Field of Classification Search
USPC .............. 701/64, 33.5, 31.4, 29.2, 22, 54, 57; 180/65.1, 65.23, 65.245; 477/3, 4, 5, 477/109
See application file for complete search history.

(56) References Cited

U.S. PATENT DOCUMENTS

| | | | | |
|---|---|---|---|---|
| 5,822,708 A * | 10/1998 | Wagner et al. | ................... | 701/54 |
| 6,209,672 B1 * | 4/2001 | Severinsky | ................ | 180/65.23 |
| 6,895,941 B2 * | 5/2005 | Matthews et al. | ............. | 123/481 |
| 7,637,846 B2 * | 12/2009 | Tamai et al. | ................... | 477/110 |
| 8,087,483 B2 * | 1/2012 | Bucknor et al. | ......... | 180/65.245 |
| 2004/0055569 A1* | 3/2004 | Matthews et al. | ............. | 123/399 |
| 2006/0100057 A1* | 5/2006 | Severinsky et al. | ............... | 477/4 |
| 2010/0038158 A1* | 2/2010 | Whitney et al. | .......... | 180/65.265 |
| 2010/0227735 A1* | 9/2010 | Sah et al. | .......................... | 477/5 |
| 2012/0065819 A1* | 3/2012 | Christman et al. | .............. | 701/22 |
| 2012/0143412 A1* | 6/2012 | Bissontz | ........................ | 701/22 |
| 2012/0203404 A1* | 8/2012 | Mituta et al. | .................... | 701/22 |
| 2012/0239233 A1* | 9/2012 | Koprubasi | ...................... | 701/22 |
| 2013/0041535 A1* | 2/2013 | Choi et al. | ...................... | 701/22 |

* cited by examiner

*Primary Examiner* — Thomas Black
*Assistant Examiner* — Wae Louie
(74) *Attorney, Agent, or Firm* — Quinn Law Group, PLLC

(57) ABSTRACT

A method includes determining an amount of power currently available from a battery for tractive torque as an amount of power stored in the battery less an amount of power required to power other vehicle components, and less an amount of power required to start the engine. An output torque limit when torque is provided only by the motor and power required to provide the output torque limit are determined based on test data. A maximum output torque is calculated by multiplying the amount of power determined to be currently available for tractive torque by a ratio of the output torque limit to the amount of power required to provide the output torque limit. The current output torque may be reduced at a predetermined rate until within a predetermined range of the lesser of the maximum output torque and the output torque limit if an engine start is requested.

18 Claims, 1 Drawing Sheet

METHOD OF CONTROLLING A HYBRID POWERTRAIN TO ENSURE BATTERY POWER AND TORQUE RESERVE FOR AN ENGINE START AND HYBRID POWERTRAIN WITH CONTROL SYSTEM

TECHNICAL FIELD

The invention relates to a method of controlling a hybrid powertrain and a hybrid powertrain with a control system that performs the method.

BACKGROUND

Some electromechanical hybrid powertrains are configured to operate in electric-only modes in which one or more motors provide power to propel the vehicle with the engine off. An electric-only operating mode is a charge-depleting mode as battery power decreases during the mode. During the charge-depleting mode, additional output torque may be commanded by a vehicle operator, requiring that the engine be started. Alternatively, the powertrain may be operated in a charge-sustaining mode after some predetermined minimum level of battery power has been reached. In the charge-sustaining mode, the engine is repeatedly stopped and started to provide periods of battery charging by a generator run by the engine, thereby preventing the battery power level from falling too far below the predetermined minimum level while at the same time keeping the engine off much of the time. Starting the engine in either of these modes requires that some battery power that could otherwise be used to provide torque at the vehicle wheels (i.e., tractive torque) is instead used to start the engine.

SUMMARY

A method of controlling a hybrid powertrain is provided that ensures an adequate reserve of battery power and torque capability to allow engine starts to occur without an accompanying undesirable level of reduction in output torque. Furthermore, if a reduction in current output torque is required to ensure adequate power and torque to start the engine, then prior to starting the engine, the rate of reduction of current output torque may be controlled in a manner that still ensures a minimal engine start time. The method relies on stored test data relating power with resulting output torque. The stored test data may account for current vehicle operating conditions, such as engine temperature, motor temperature, battery voltage, and transmission output speed.

Specifically, a method of controlling a powertrain on a vehicle includes determining an amount of power currently available from a battery for tractive torque. The amount of power currently available from the battery for tractive torque is an amount of power stored in the battery less an amount of power required to power at least some other electrically-powered vehicle components, and less an amount of power required to start the engine. The amount of power currently available from the battery for tractive torque thereby ensures battery power reserve to start the engine. An output torque limit when torque is provided only by the motor and an amount of power required to provide the output torque limit are determined based on stored test data and current operating conditions. A power-based maximum output torque that ensures a reserve of power required to start the engine is calculated by multiplying the amount of power determined to be currently available for tractive torque by a ratio of the output torque limit to the amount of power required to provide the output torque limit. The lesser of the power-based maximum output torque and the output torque limit is selected as the maximum operating output torque of the powertrain to reduce torque sag when the engine is started. If the motor both provides output torque and starts the engine, then the maximum operating output torque is reduced by the amount of torque required to start the engine. The current output torque is reduced in a controlled manner, at a predetermined rate of change until the current output torque is within a predetermined range of the maximum operating output torque if an engine start is requested. The rate of change of the output torque may be a function of the steadiness of an operator accelerator input device, such as an accelerator pedal, over a predetermined period of time. The maximum operating output torque may also be adjusted based on the effect of motor temperature, hardware limitations of torque-transmitting mechanisms, and active damping requirements. A hybrid powertrain having a control system with a processor that implements the method is also provided.

The above features and advantages and other features and advantages of the present invention are readily apparent from the following detailed description of the best modes for carrying out the invention when taken in connection with the accompanying drawings.

DETAILED DESCRIPTION

Figure 1:
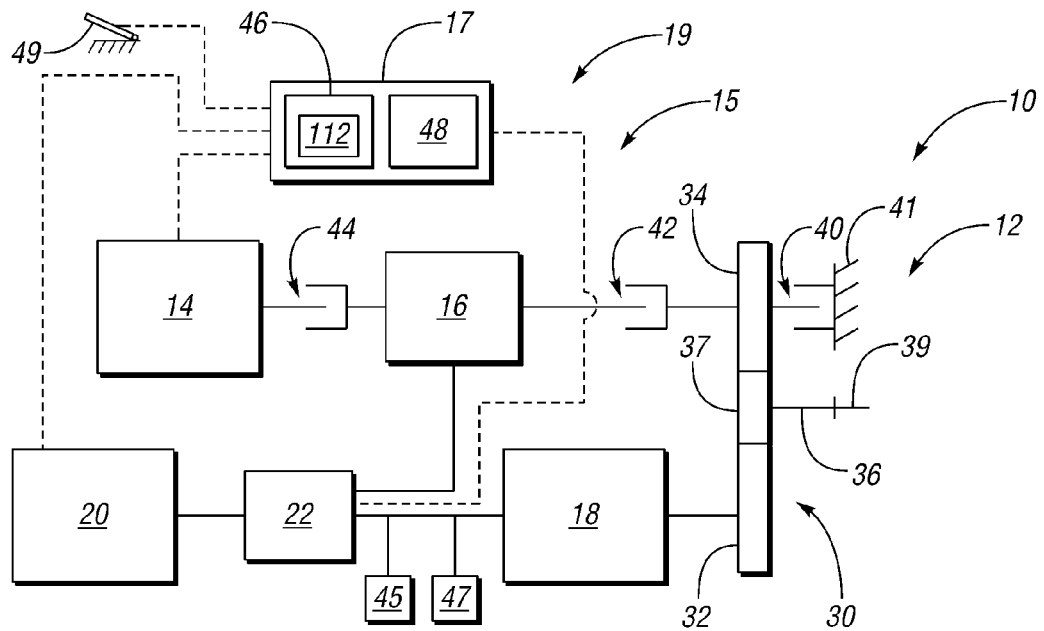
FIG. 1 is a schematic illustration of an extended range electric hybrid powertrain.

Referring to the drawings, wherein like reference numbers refer to like components throughout the several views, FIG. 1 shows a hybrid vehicle 10 with a hybrid powertrain 12. Although the powertrain 12 is shown in a vehicle, such as an automotive vehicle, the powertrain 12 may also be used for powering a ship, as a power plant for a building, or for any application that utilizes an engine and a motor/generator to provide power.

The powertrain 12 includes an engine 14 and a hybrid transmission 15. The hybrid transmission 15 includes a first motor/generator 16, a second motor/generator 18, and a planetary gear set 30. The engine 14 powers the first motor/generator 16. The first motor/generator 16 provides electrical power to the second motor/generator 18 by generating electrical energy that is delivered through a module 22 that functions as a motor controller and a power inverter. The engine 14, the first motor/generator 16, and the second motor/generator 18 are controlled by a controller 17 according to a stored algorithm 120. In some embodiments, multiple controllers may be used to jointly carry out the functions of the controller 17. In some operating modes, the first motor/generator 16 may also be controlled to function as a motor. However, for purposes of the method 100 described below, the first motor/generator 16 is referred to as a generator and the second motor/generator 18 is referred to as a motor. A battery 20 is also controlled by the controller 17 to provide electrical power to the second motor/generator 18 through the module 22. The battery 20 may be one or more batteries forming a battery pack. The controller 17 tracks the amount of electrical power in the battery 20 via voltage sensors in the battery 20.

The second motor/generator 18 is connected for common rotation with a sun gear member 32 of the planetary gear set 30. The sun gear member 32 meshes with pinion gears 37 supported by a carrier member 36. The carrier member 36 rotates with an output member 39 connected through a remaining drive train and vehicle wheels (not shown) and provides output torque to propel the vehicle 10. The pinion gears 37 also mesh with a ring gear member 34 of the planetary gear set 30.

The powertrain 12 includes three torque-transmitting mechanisms: a brake-type clutch 40, and two rotating-type clutches 42 and 44 that are selectively engageable according to control signals from the controller 17. When the powertrain 12 is operating in a first electric vehicle mode, clutch 40 is engaged to ground the ring gear member 34 to a stationary member 41, clutches 42 and 44 are disengaged, and electrical power flows from the battery 20 to power the second motor/generator 18, which functions as a motor to provide torque at the sun gear member 32. Torque is then provided through the planetary gear set 30 to the output member 39. When the powertrain 12 is operating in a second electric vehicle mode, clutch 40 is disengaged, clutch 42 is engaged, clutch 44 is disengaged, and electrical power flows from battery 20 to power both the first motor/generator 16 and the second motor/generator 18 to function as motors, and through planetary gear set 30 to the output member 39. In either electric vehicle mode, electric vehicle accessories 45, such as an air conditioner, and an auxiliary pump 47 draw some of the electrical power from the battery 20. The auxiliary pump 47 provides hydraulic pressure necessary to engage the clutches 40, 42, 44 when the engine 14 is off and a main pump powered by the engine 14 is not operating. In the load-sharing, series operating mode described below, the motor/generator 16 operates as a generator to provide some of the electrical power required by the vehicle accessories 45 and the auxiliary pump 47.

If the state of charge of the battery 20 drops too low, clutch 44 is engaged so that the first motor/generator 16 may be controlled to function as a motor to start the engine 14, while clutch 40 remains engaged, clutch 42 disengaged, and the second motor/generator 18 continues to function as a motor providing torque at the output member 39 through the planetary gear set 30. Thus, while the engine 14 is being started, some battery power that could otherwise be directed to the output member 39 through the planetary gear set 30 to produce torque at the output member 39 is needed by the first motor/generator 16 to start the engine 14. The algorithm 112 described below controls the powertrain 10 so that the rate of change in output torque at the output member 39 during such an engine start is controlled to a level that is determined to be acceptable to vehicle occupants.

Once the engine 14 is started, it provides torque to the first motor/generator 16 which functions as a generator to provide electrical power to the second motor/generator 18 via the module 22. The second motor/generator 18 functions as a motor. This operating mode may be referred to as a hybrid series operating mode. A vehicle with such a powertrain configuration operable in a series operating mode is sometimes referred to as an extended range electric vehicle, because the use of the engine 14 to power the first motor/generator 16 extends the driving range of the vehicle 10 in comparison to the driving range based solely on using stored energy from the battery 20.

During a load-sharing electric mode, clutch 42 is engaged to allow both first motor/generator 16 and second motor/generator 18 to function as motors. First motor/generator 16 adds power through ring gear 34 while second motor/generator 18 adds power through sun gear 32. During another load-sharing mode, clutches 42 and 44 are engaged, allowing the engine 14 to provide power to the ring gear member 34 while second motor/generator 18 functions as a motor to provide power to the sun gear member 32. During regenerative braking, clutch 42 is engaged and torque at the output member 39 is slowed by converting rotational energy into electrical energy via the first motor/generator 16.

The electronic controller 17 is part of a control system 19 that also includes sensors in the battery 20 and sensors configured to sense operating conditions indicative of torque at the output member 39. The electronic controller 17 is operatively connected to the engine 14, the motor/generators 16, 18, the battery 20, and to the module 22 via CAN busses and controls their operation according to the algorithm 112 stored in a processor 46. The controller 17 is also operatively connected to an operator accelerator input device 49, such as an accelerator pedal, in order to monitor the position of the device 49 through sensors. A database 48 containing test data is also stored on the controller 17 and accessed by the processor 46. The test data is taken from testing a powertrain with motor/generators 16, 18 and other components substantially identical to powertrain 10.

Figure 2:
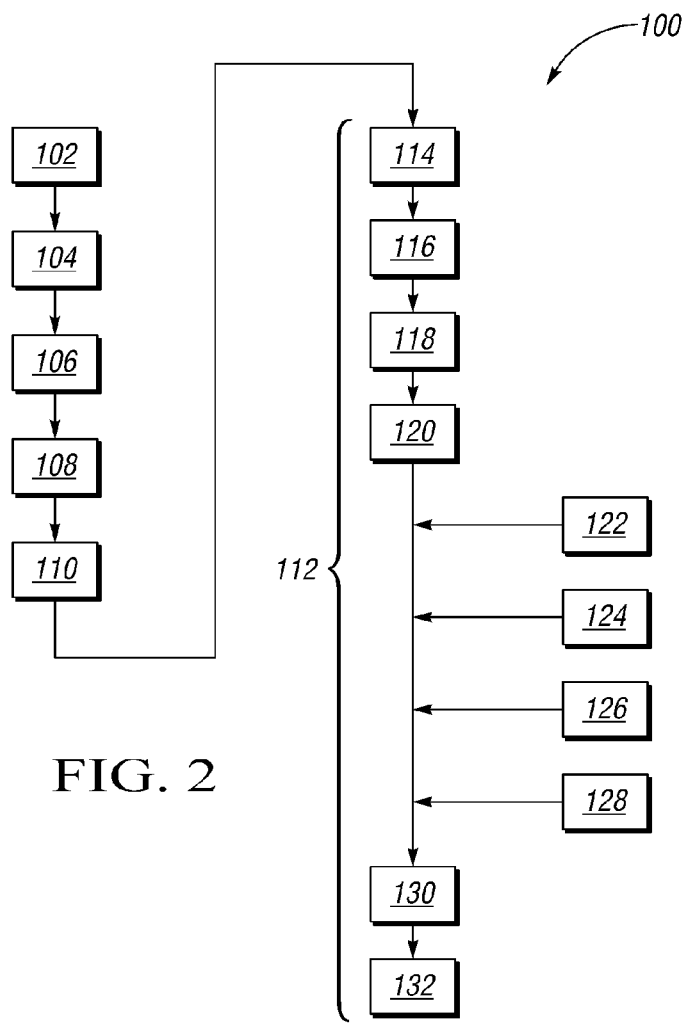
FIG. 2 is a flowchart of a method of controlling a hybrid powertrain such as the powertrain of FIG. 1.

Referring to FIG. 2, a method 100 of controlling a hybrid powertrain is shown as a flow diagram and is described below in detail with respect to the powertrain 12 of FIG. 1. The method 100 includes testing carried out on a dynamometer to create the stored database 48, as well as the algorithm 112 that uses the stored database 48 and is carried out by the controller 17. The method 100 is not limited to the powertrain 12, and may be used on other hybrid electro-mechanical powertrains that have both electric-only operating modes and require a shift to a hybrid operating mode by using a motor to start an engine during the electric-only operating mode.

The method 100 begins with dynamometer testing in blocks 102, 104, and 106. In block 102, the peak battery power (Pwr2Strt) required to start the engine 14 at different engine temperatures (which correlate with engine friction) is determined by testing a powertrain substantially identical to powertrain 10 on a dynamometer and recording the data. Operating conditions in addition to the engine temperature may also be tracked, such as the speed of the output member 39 when the engine 14 is started.

In block 104, the amount of battery power required to power other electric vehicle components using the battery 20 is determined. The amount of battery power required may be a filtered amount. That is, a filtering function may be applied to the measured amount in order to filter out any effect of temporary spikes in required power, as such spikes are not reflective of sustained power requirements and should not be a factor in controlling the powertrain 10 prior to an engine start. For example, the battery power required to run the vehicle accessories 45 may be filtered. The battery power required to run the auxiliary pump 47 is also tracked and included in the amount of battery power determined in block 104.

In block 106, the output torque limit (ToMxCap) of the powertrain 12 (i.e., the maximum torque achievable at the output member 39 in the electric-only operating mode when the engine 14 is off and the motor/generator 18 functions as a motor to provide torque at the output member 39) and the power required from the battery 20 to provide the output torque limit (Pwr4ToMxCap) is tested at various battery voltages and transmission output speeds. All of the mechanical and electrical losses (i.e., inefficiencies) in the powertrain 12 are accounted for by performing actual testing on a dynamometer. The power required to provide the output torque limit is (Pwr4ToMxCap).

In block 108, for powertrains in which the same motor/generator used to start the engine also provides output torque at the transmission output member, the peak torque required to start the engine is tested at various operating conditions such as various engine temperatures and transmission output speeds. For example, if powertrain 12 did not have the first motor/generator 16 or the clutch 42, then the engine 44 would be directly connectable to the planetary gear set 30 via clutch 44. In such a powertrain, the second motor/generator 18 would be used to start the engine 14 and would also provide the torque at the output member 39 through the planetary gear set 30.

In block 110, the test data collected in blocks 102, 106, and 108 is stored in the database 48 as different lookup tables used by the algorithm 112 as described below. Once the database 48 is created in blocks 102, 106, 108 and 110, the portion of the method 110 carried out by the processor 46, i.e., the algorithm 112, begins with block 114. In block 114, the amount of power currently available (PwrAvail) from the battery 20 for tractive torque is determined. This amount (PwrAvail) is equal to the amount of power stored in the battery 20 as indicated by voltage sensors, less the amount of power required to power the electrically-powered vehicle components, as determined in block 104, and also less the amount of power required to start the engine 14 given the current engine temperature and the speed of the output member 39, as determined in block 102 and stored in the database. The amount of power stored in the battery 20 as indicated by voltage sensors, and the amount of battery power required to power other vehicle components determined in block 104 are determined on a continuous (real-time) basis rather than from information stored in the database 48. Thus, the amount of power currently available from the battery for tractive torque (PwrAvail) determined in block 114 is the power used to determine the "power-based" capacity and ensures battery power reserve to start the engine 14.

Next, the algorithm 112 moves to block 116, in which an output torque limit at the output member 39 (ToMxCap) when torque is provided only by the motor/generator 18 is determined, and the amount of electrical power required to provide that amount of torque is also determined using the test data from block 106 that was stored in step 110. The (ToMxCap) data point selected from the stored data will be that corresponding with the current battery voltage and transmission output speed.

In block 118, a power-based maximum output torque is determined that ensures a reserve of power required to start the engine 14 by multiplying the amount of power determined to be currently available for tractive torque (PwrAvail) in step 114 by a ratio of the output torque limit (ToMxCap) from block 116 to the amount of power required to provide the output torque limit (Pwr4ToMxCap) also determined in block 116.

Next, in block 120, the power-based maximum output torque from block 118 and the output torque limit (ToMxCap) from block 116 are compared and the lesser is selected as the maximum operating output torque of the powertrain 12 to reduce torque sag when the engine 14 is started. The comparison in block 120 is required because at low speeds of the output member 39, the maximum output torque capacity (ToMxCap) determined in block 116 will be lower than the output torque determined in block 118 (i.e., the maximum output torque will be determined by the mechanical limits of motor/generator 18) even though power to provide a greater torque is available, while at higher speeds of the output member 39, the power-based maximum output torque from block 118 will be the lesser torque value.

Several optional portions of the algorithm 112 are described in blocks 122, 124, 126, and 128, and are used to refine the torque limit determined in block 118 based on additional operating conditions and system limitations. For example, in block 122, the effect of the temperature of the motor/generators 16, 18 on the torque limit can be accounted for by adjusting the maximum operating output torque based on motor temperature. As the motor/generator 18 gets hotter, the motor controller of module 22 will reduce its torque capacity according to a motor-temperature based scalar (i.e. a constant value) that is multiplied by the maximum operating output torque.

Additionally, in block 124, the possibility of a hardware limitation on torque distinct from the torque limit of the motor/generator 18 can be accounted for. The maximum operating output torque of block 118 is compared to a predetermined maximum torque based on hardware limitations, such as the maximum torque that can be transmitted by one of the selectively engageable torque-transmitting mechanisms. For example, the clutch 40 is engaged in the electric-only operating mode in which the motor/generator 18 functions as a motor with the engine 14 off. The maximum torque capacity of the clutch 40 may be used to revise the maximum operating output torque of block 118 to be equal to the predetermined maximum torque capacity of clutch 40 if it is less than the maximum operating output torque of block 118.

Furthermore, if the powertrain 12 utilizes the engine 14, and/or either of the motor/generators 16, 18 for active damping, then, in block 126, the maximum operating output torque of block 118 can be reduced by a predetermined amount that ensures adequate battery reserve and motor torque to provide the active damping. In active damping, the controller 17 controls the torque of the engine 14 and/or motor/generators 16 and 18 to dampen and thereby offset oscillations that cause unintended torque variations at the output member 39.

Finally, in block 128, the maximum operating output torque of block 118 is reduced by the peak torque required to start the engine, as determined in block 108, for those powertrains in which the same motor/generator that provides torque at the output member 39 is also used to provide torque to start the engine 14.

The maximum operating output torque determined in block 118 is thus adjusted and reduced by any of the blocks 122, 124, 126 and 128 that apply to the particular powertrain configuration being controlled by the algorithm 112. The reductions and adjustments to the maximum operating output torque of block 118 are thus cumulative.

Once the maximum operating output torque of block 118 is reduced and adjusted according to the applicable ones of blocks 122, 124, 126 and 128, if the controller 17 determines that an engine start is requested during an electric-only operating mode, the maximum operating output torque is compared with the current output torque at output member 39, and the current output torque is then decreased at a predetermined rate of change in block 130 until the current output torque is within a predetermined range of the maximum operating output torque, at which point the engine 14 can be started. The engine start may be requested for a switch to an operating mode in which the engine 14 provides output torque or a switch to a charge-sustaining mode in which the engine 14 powers the generator 18 to power the motor 16. This controlled reduction in output torque ensures that the engine 14 can be started with a seamless transition from electric-only operating mode to hybrid series operating mode, as there will not be a sharp decrease in torque at the output member 39 (torque sag) that is noticeable to a vehicle occupant when some of the available battery power must be used to provide the torque to start the engine 14, and thus cannot be used to provide torque at the output member 39 while the engine 14 is starting.

The controlled rate of reduction of block 130 is based on a position of the accelerator input device 49 as monitored by the controller 17. In block 132, the input device 49 is constantly monitored by the controller 17. If the position of the accelerator input device 49 stays within a predetermined range of an initial position over a predetermined period of time prior to the engine start request, then the vehicle operator has kept the vehicle relatively steady, and the rate of reduction of output torque needs to be at a relatively slow first rate of change in order to be as unnoticeable as possible to the vehicle operator. If the accelerator input device 49 moves outside of the predetermined range of the initial position during the predetermined period of time, then the rate of reduction of output torque is at a second rate of change that is faster than the first rate of change.

According to the method 100, the battery power reserve required to start the engine 14 without significant torque sag at the output member 39 during an electric-only operating mode is considered from both a torque-based and power-based perspective, and the powertrain 10 is controlled to ensure that sufficient battery power is present prior to the engine start. The output torque is reduced at a controlled rate of change, if necessary, to bring the output torque down to a level that will prevent noticeable torque sag when the engine 14 is started. The controlled rate is a function of the steadiness of the position of an operator accelerator input device 49, such as an accelerator pedal, over a predetermined period of time.

While the best modes for carrying out the invention have been described in detail, those familiar with the art to which this invention relates will recognize various alternative designs and embodiments for practicing the invention within the scope of the appended claims.

The invention claimed is:

1. A method of controlling a powertrain on a vehicle, wherein the powertrain has an engine, a transmission with an output member, and a motor, comprising:
   determining an amount of power currently available from a battery for tractive torque; wherein the amount of power currently available from the battery for tractive torque is an amount of power stored in the battery less an amount of power required to power at least some other electrically-powered vehicle components, and less an amount of power required to start the engine, the amount of power currently available from the battery for tractive torque thereby ensuring battery power reserve to start the engine;
   determining an output torque limit at the output member when torque is provided only by the motor, and an amount of power required to provide the output torque limit based on stored test data and current operating conditions;
   calculating a power-based maximum output torque that ensures a reserve of power required to start the engine by multiplying the amount of power determined to be currently available from the battery for tractive torque by a ratio of the output torque limit of the motor to the amount of power required to provide the output torque limit; and
   selecting the lesser of the power-based maximum output torque and the output torque limit as the maximum operating output torque of the powertrain to reduce torque sag when the engine is started.

2. The method of claim 1, further comprising:
   reducing the maximum operating output torque by the amount of torque required to start the engine if the motor both provides output torque and starts the engine.

3. The method of claim 1, further comprising:
   decreasing current output torque at a predetermined rate of change until the current output torque is within a predetermined range of the maximum operating output torque if an engine start is requested.

4. The method of claim 3, further comprising:
   monitoring a position of an accelerator input device; wherein the predetermined rate of change is a first rate of change if the monitored position varies less than a predetermined amount during a predetermined period of time, and is a second rate of change if the monitored position of the accelerator input device varies at least by the predetermined amount over the predetermined period of time.

5. The method of claim 3, wherein the powertrain further includes a generator operatively connected to the engine and to the motor to provide a series operating mode; and
   wherein the engine start is requested for one of a switch to an operating mode in which the engine provides output torque and a switch to a charge-sustaining mode in which the engine powers the generator to power the motor.

6. The method of claim 1, further comprising:
   storing the test data in a database that relates the output torque limit and the amount of power required to provide the output torque limit at various battery voltages and transmission output speeds.

7. The method of claim 1, further comprising:
   adjusting the maximum operating output torque based on motor temperature.

8. The method of claim 1, wherein the powertrain has at least one selectively engageable torque-transmitting mechanism engageable to at least partially establish an operating mode of the powertrain, and further comprising:
   comparing the maximum operating output torque to a predetermined maximum torque based on hardware limitations of the at least one selectively engageable torque-transmitting mechanism; and
   revising the maximum operating output torque to equal the predetermined maximum torque based on hardware limitations if the predetermined maximum torque based on hardware limitations is less than the maximum operating output torque.

9. The method of claim 1, wherein either of the engine and the motor are controlled to provide active damping of the powertrain; and further comprising:
   reducing the maximum operating output torque by a predetermined amount that ensures adequate battery power reserve and motor torque to provide the active damping.

10. A method of controlling a hybrid powertrain having an engine, an electric motor, and a battery operatively connected to the motor to deliver electric power to the motor when the motor provides torque to an output member for propulsion in an electric-only operating mode, and wherein the battery provides electric power to the motor when the motor provides torque to start the engine, the method comprising:
    determining the amount of battery power required to start the engine based on stored test data relating peak power to start the engine at least to engine temperature;
    determining the amount of battery power required to power other electric vehicle components;
    determining an amount of power currently available from the battery for tractive torque; wherein the amount of power currently available from the battery for tractive torque is an amount of power stored in the battery less the determined amount of battery power required to power the other electric vehicle components, and less the determined amount of battery power required to start the engine;

determining an output torque limit at the output member when torque is provided only by the motor and an amount of power required to provide the output torque limit based on stored test data and current operating conditions;

calculating a power-based maximum output torque by multiplying the amount of power determined to be currently available for tractive torque by a ratio of the output torque limit of the motor to the amount of power required to provide the output torque limit;

selecting the lesser of the power-based maximum output torque and the output torque limit as the maximum operating output torque of the powertrain;

reducing the maximum operating output torque by the amount of torque required to start the engine if the motor both provides output torque and starts the engine; and decreasing current output torque at a predetermined rate of change until the current output torque is within a predetermined range of the maximum operating output torque if an engine start is requested.

11. The method of claim 10, wherein the engine start is requested for one of a switch to an operating mode in which the engine provides output torque and a switch to a charge-sustaining mode in which the engine powers a generator that powers the motor.

12. The method of claim 10, further comprising:
storing the test data in a database that relates the output torque limit and the amount of power required to provide the output torque limit at various battery voltages and transmission output speeds.

13. The method of claim 10, further comprising:
adjusting the maximum operating output torque based on motor temperature.

14. The method of claim 10, wherein the powertrain has at least one selectively engageable torque-transmitting mechanism engageable to at least partially establish an operating mode of the powertrain, and further comprising:
comparing the maximum operating output torque to a predetermined maximum torque based on hardware limitations of the at least one selectively engageable torque-transmitting mechanism; and
revising the maximum operating output torque to equal the predetermined maximum torque based on hardware limitations if the predetermined maximum torque based on hardware limitations is less than the maximum operating output torque.

15. The method of claim 10, wherein the engine and the motor are controlled to provide active damping of the powertrain; and further comprising:
reducing the maximum operating output torque by a predetermined amount that ensures adequate battery reserve and motor torque to provide the active damping.

16. The method of claim 10, further comprising:
monitoring a position of an accelerator input device; wherein the predetermined rate of change is a first rate of change if the monitored position varies less than a predetermined amount during a predetermined period of time, and is a second rate of change if the monitored position of the accelerator input device varies at least by the predetermined amount over the predetermined period of time.

17. A hybrid powertrain comprising:
an engine;
a transmission with an input member operatively connectable to the engine and with an output member;
an electric motor operable to provide torque through the transmission to the output member for propulsion in an electric-only operating mode and operable to provide torque to start the engine;
a generator operatively connectable to the input member to receive power from the engine and generate electrical power to power the motor in a series operating mode;
a battery operatively connected to the motor to deliver electric power to the motor in the electric-only operating mode and when the motor provides torque to start the engine,
a control system having a controller with a processor that executes an algorithm that
determines a power-based maximum output torque that ensures adequate battery power reserve to start the engine;
compares the power-based maximum output torque to a predetermined output torque limit; and
decreases torque at the output member at a controlled rate to achieve a torque within a predetermined range of the lesser of the power-based maximum output torque and the predetermined output torque limit prior to the motor starting the engine when an engine start is requested, thereby reducing torque sag at the output member.

18. The hybrid powertrain of claim 17, wherein the controller has a stored database of the power-based maximum output torque and the output torque limit as functions of battery voltage and motor speed determined from dynamometer testing of another motor substantially identical to the motor.

* * * * *